June 28, 1927.

R. G. JONES

DEPHLEGMATOR

Filed Jan. 13, 1926

1,633,990

Patented June 28, 1927.

1,633,990

UNITED STATES PATENT OFFICE.

RICHARD GIRARD JONES, OF HYNES, CALIFORNIA.

DEPHLEGMATOR.

Application filed January 13, 1926. Serial No. 80,890.

My invention relates to refining apparatus, and it relates particularly to a novel dephlegmator.

It is an object of this invention to provide an apparatus of this character which has an extensive contact surface.

It is a further object of the invention to provide an apparatus of this character which is adapted to collect oils of different boiling points.

It is another object of this invention to provide an apparatus of this character which is simple in construction, having three main parts which are facilely assembled and disassembled.

It is a still further object of my invention to provide an apparatus of this character having novel means for drawing condensates from the collection chambers.

Other objects and the salient advantages of this invention will be made evident hereinafter.

Referring to the drawings in which I illustrate a preferred embodiment of my invention, Fig. 1 is a central vertical cross section therethrough.

Fig. 2 is a fragmentary horizontal section taken substantially as indicated by the line 2—2 of Fig. 1.

Fig. 3 is an enlarged fragmentary view showing the lower part of one of the collection chambers of my invention.

Fig. 4 is a section taken through an outlet means of the invention and substantially on the line 4—4 of Fig. 3.

The form of the invention shown in the drawings consists of a shell 11 having a cylindrical wall 12 and a flat bottom 13. Extending upwardly from the bottom 13 inside the cylindrical wall 12 is a plurality of concentric cylindrical walls 14, 15 and 16 which divide the shell 11 into a plurality of collection chambers 19, 20 and 21. It should be noted in Fig. 1 that upper ends 23 of the walls 14, 15 and 16 do not extend to the top of the shell 11.

Situated inside the shell 11 is a septum member 25 which is provided with a cylindrical flange 26 which rests upon a flange 27 formed at the upper outer part of the cylindrical wall 12 of the shell 11. The septum member 25 provides a series of concentric cylindrical septums 29, 30 and 31. As shown best in Fig. 1, the septums 29, 30 and 31 are substantially V shape and are connected together at their upper ends. The septum member 25 is also provided with an inner cylindrical flange 33 which rests on a cylindrical flange 34 formed at the upper end of the cylindrical wall 16. The septums 29, 30 and 31 respectively extend into the collection chambers 19, 20 and 21 respectively. The lower ends of these V-shaped septums extend very close to the bottoms of the collection chambers.

The upper end of the shell 11 is closed by a cover 38 which rests in engagement with the cylindrical flange 26 of the septum member 25. The cover 38 extends entirely over the shell 11 and also over the septum member 25. The upper end of the cylindrical wall 16 is closed by a plate 40 which rests on the inner cylindrical flange 33 of the septum member 25. Extending downwardly from the cover 38 is a plurality of baffles 41, 42 and 43, these baffles extending into a space 44 formed between the cover 38 and the septum member 25. The cylindrical baffles 41, 42 and 43 respectively extend down between the legs of the V-shaped septums 29, 30 and 31 respectively, and the lower ends 45 thereof are positioned very near to the bottoms of these V-shaped septums. The septums 29, 30 and 31 are corrugated as shown in Fig. 1 and in Fig. 3. The purpose of this corrugation is to provide a very extensive contact surface. Secured to the lower ends of each of the septums 29, 30 and 31 and in each of the collection chambers is a conical screen 46. The conical screens 46 are formed of plates which have openings 47 punched therein, these openings being either cylindrical or in the form of slots, as desired. Each of the collection chambers 19, 20 and 21 is provided with an outlet pipe 50; each of said outlet pipes 50 being provided with a valve 51.

Referring to Fig. 4, the outlet pipes extend through the bottom 13 of the shell 11 and the inner end of each of the outlet pipes 50 is provided with an inverted U-shaped portion 53. The end 54 of the U-shaped portion 53 is positioned directly adjacent to the bottom 13 so that it withdraws liquid from the bottom of the collection chamber in which it is placed. The upper part of each of the U-shaped portions 53 is provided with a pressure relief port 55. Each of the collection chambers 19, 20 and 21 is provided with a drain pet-cock 57. Connected to the upper part of the annular collection chamber 19 is an inlet pipe 55' having a valve 56. Vapor passes into the collection chamber 19, filling it, and passes down to the lower end thereof, being guided by the outer leg of the septum 29. The vapor must pass through the screen 47 so that it may pass upwardly through the other side of the chamber 19 and into the next collection chamber 20. It should be noted that the collection chambers 19, 20 and 21 are all connected together at their upper ends, since the upper ends of the cylindrical walls 14 and 15 do not extend entirely to the upper ends of the septums 29, 30 and 31. The vapor passes from the inner collection chambers through openings 57 formed at the upper end of the cylindrical wall 16 into a space 58. An outlet pipe 59 is connected to the space 58 and any remaining vapor may be conducted from the apparatus through this pipe 59, this pipe 59 being provided with a valve 60. A treating medium is introduced into the space 44 by means of a pipe 62 having a valve 63. This pipe 62 connects to the space 44, preferably at the center thereof, and inside the cylindrical baffle 43. The treating medium flows as indicated by arrows 65, down along the inner leg of the septum 31, around the baffle 43 and up along the other leg of the septum 31, and passes above the upper ends of the septums 30 and 31 through a space 66 provided between these septums and the cover 38. The treating medium then passes around the next baffle 42 through a space 67, around the baffle 41, and is conducted from the apparatus through a pipe 68 having a valve 69.

The operation of my invention when used as a dephlegmator is as follows:

The cooling medium which may be water, as generally used, is passed through the apparatus as indicated by the arrow 65, passing around the baffle plates and thereby being guided into contact with the walls of the septums 29, 30 and 31. The vapors to be dephlegmated pass into the apparatus through the pipe 55' and are directed as indicated by the arrows 56'. More specifically, however, the vapors pass downward in the collection chamber 19 and are brought into contact with the outer leg of the septum 29. For the purpose of dephlegmating the vapors condensed by this contact of the vapor mixture with the septums a body of absorbing liquid as indicated at 70 in Fig. 3 is kept in each of the collection chambers. The vapor therefore is forced through the body of liquid 70 in the collection chamber 19, passing through the screen 46 thereof. The vapor at this time has a portion of the higher boiling point vapors condensed therefrom. The remaining vapors pass up around the upper end of the cylindrical wall 14 into the next collection chamber 20, where it is directed downward through the body of liquid 70 therein, and passes up around the cylindrical wall 15 into the collection chamber 21. The vapor is guided through the collection chamber 21 in the same manner as it is in the collection chambers 19 and 20, being forced through a body of liquid 70 therein, then passing upward and through the openings 57' into the space 58, whereupon it is drawn from the apparatus through the pipe 59. By providing three collection chambers it is possible to separately collect condensates of different boiling points. The boiling point of the condensates collected, of course, depends upon the temperature in each of the collection chambers. Therefore, by controlling the temperatures therein it is possible to control the boiling points of the oil. This may be done by special control apparatus in each of the collection chambers. It also may be done by regulating the flow of the treating medium through the apparatus. A great portion of the vapors are condensed when they pass through the apparatus, only a portion thereof (the low boiling point vapors) pass from the apparatus through the pipe 59. The screens 46 assist in breaking up the vapors and bringing them into intimate contact with the bodies of liquid 70.

One feature of the invention is the provision of a septum member having a plurality of septums which provide extensive contact surfaces. This feature is brought to pass by corrugating the septums. Another feature of the invention resides in the novel means of outlet arrangement as shown in Fig. 4. It will be seen that the inner ends of the inverted U-shaped portions 53 connect to the chambers very close to the bottom 13. Therefore, any liquid which passes therefrom will be withdrawn from the bottom of the chambers. This is very desirable since the vapors generally have some steam content which, when condensed, form water which collects in the bottoms of the chambers. Water is not an effective absorbing agent and it is therefore desirable to withdraw it from the chambers as soon as collected. My invention accomplishes this, since it connects to the chambers directly at the bottoms thereof. The level of the liquid is maintained so that the screens 46 are always submerged, the level of the liquid in each of the collection chambers being controlled by the upper portions of the U-shaped portions 53 of the outlet pipes 50.

The pressure relief ports 55 are provided so that any excessive pressure in any of the collection chambers may be relieved. If these ports 55 are not provided, an excess of pressure would force the levels of the liquid down below the upper parts of the screens 46 and would allow the vapor to pass therethrough without bubbling through the bodies of liquid. This would cut down the efficiency of the apparatus, since there would be no absorbing action on the vapors.

Another feature of the invention is that it is simple in construction. The apparatus consists of three main parts; one being the shell 11 having the cylindrical walls 14, 15 and 16; another part being the septum member 25; and the third being the cover 38 having the cylindrical baffles 41, 42 and 43. These parts may be readily assembled and disassembled for the purpose of repair and inspection, or for cleaning the apparatus. Under some circumstances it may be desirable to reverse the flow of the treating medium or the vapor, either singly or together, but this comes within the scope of my invention, which should be construed wholly by the following claims.

I claim as my invention:

1. In an oil vapor condensing and rectifying device, the combination of: a series of collection chambers each having an inlet and an outlet near the top thereof; a hollow partition member in each chamber through which cooling fluid is circulated; a perforated member depending from the bottom of said hollow partition; and an inverted U-shaped outlet pipe disposed in each chamber, said pipe extending upwardly to substantially the same level as the bottom of the hollow partition, with its inner end disposed near the bottom of the chamber, and an opening in the bend thereof whereby the condensate while being drawn off from near the bottom of the compartment is maintained at a constant level, and is rectified as to boiling point by the hot vapor mixture bubbling through the submerged perforated member.

2. In an oil vapor condensing and rectifying device, the combination of: a series of adjacent collection chambers, immediately adjacent chambers being separated by a common wall and each having an inlet and an outlet near the top thereof; a hollow partition member in each chamber through which cooling fluid is circulated; a perforated member depending from the bottom of said hollow partition; and an inverted U-shaped outlet pipe disposed in each chamber, said pipe extending upwardly to substantially the same level as the bottom of the hollow partition, with its inner end disposed near the bottom of the chamber, and an opening in the bend thereof whereby the condensate while being drawn off from near the bottom of the compartment is maintained at a constant level, and is rectified as to boiling point by the hot vapor mixture bubbling through the submerged perforated member.

3. In an oil vapor condensing and rectifying device, the combination of: a series of collection chambers each having an inlet and an outlet near the top thereof; a substantially V-shaped hollow partition member in each chamber through which cooling fluid is circulated; a perforated member depending from the bottom of said hollow partition; and an inverted U-shaped outlet pipe disposed in each chamber, said pipe extending upwardly to substantially the same level as the bottom of the hollow partition, with its inner end disposed near the bottom of the chamber, and an opening in the bend thereof whereby the condensate while being drawn off from near the bottom of the compartment is maintained at a constant level, and is rectified as to boiling point by the hot vapor mixture bubbling through the submerged perforated member.

4. In an oil vapor condensing and rectifying device, the combination of: a series of collection chambers each having an inlet and an outlet near the top thereof; a substantially V-shaped hollow partition member in each chamber through which cooling fluid is calculated; a baffle extending nearly to the bottom of said hollow partition member around which said cooling fluid must pass; a perforated member depending from the bottom of said hollow partition; and an inverted U-shaped outlet pipe disposed in each chamber, said pipe extending upwardly to substantially the same level as the bottom of the hollow partition, with its inner end disposed near the bottom of the chamber, and an opening in the bend thereof whereby the condensate while being drawn off from near the bottom of the compartment is maintained at a constant level, and is rectified as to boiling point by the hot vapor mixture bubbling through the submerged perforated member.

5. In an oil vapor condensing and rectifying device, the combination of: a series of collection chambers each having an inlet and an outlet near the top thereof, each chamber communicating directly with the next adjacent chamber; a hollow partition member in each chamber through which cooling fluid is circulated; a perforated member depending from the bottom of said hollow partition; and an inverted U-shaped outlet pipe disposed in each chamber, said pipe extending upwardly to substantially the same level as the bottom of the hollow partition, with its inner end disposed near the bottom of the chamber, and an opening in the bend thereof whereby the condensate while being drawn off from near the bottom of the compartment is maintained at a constant level, and is rectified as to boiling point by the hot vapor mixture bubbling through the submerged perforated member.

In testimony whereof, I have hereunto set my hand at Los Angeles, California, this 7th day of January, 1926.

RICHARD GIRARD JONES.